(12) United States Patent
Kingrey et al.

(10) Patent No.: US 8,080,912 B2
(45) Date of Patent: Dec. 20, 2011

(54) METHODS AND APPARATUS FOR REDUCING THE SIZE OF ELECTRIC MOTORS

(75) Inventors: Harold C. Kingrey, Huntington, IN (US); Daniel S. Figgins, Fort Wayne, IN (US); Raghavendra Hirurkar, Karnataka (IN)

(73) Assignee: RBC Manufacturing Corporation, Wausau, WI (US)

( * ) Notice: Subject to any disclaimer, the term of this patent is extended or adjusted under 35 U.S.C. 154(b) by 60 days.

(21) Appl. No.: 12/330,944

(22) Filed: Dec. 9, 2008

(65) Prior Publication Data
US 2010/0052445 A1    Mar. 4, 2010

Related U.S. Application Data

(60) Provisional application No. 61/093,124, filed on Aug. 29, 2008.

(51) Int. Cl.
*H02K 5/00*    (2006.01)
(52) U.S. Cl. ........................................... 310/89; 310/90
(58) Field of Classification Search ............. 310/89–90, 310/71, 68 R
See application file for complete search history.

(56) References Cited

U.S. PATENT DOCUMENTS

| | | | |
|---|---|---|---|
| 3,707,037 A * | 12/1972 | Gutris | 29/596 |
| 3,732,616 A * | 5/1973 | Masrrodonato et al. | 29/596 |
| 3,884,385 A * | 5/1975 | Schaefer | 220/309.2 |
| 3,990,141 A | 11/1976 | Stark | |
| 4,076,989 A * | 2/1978 | Watson | 310/89 |
| 4,151,430 A | 4/1979 | Stark | |
| 4,259,603 A * | 3/1981 | Uchiyama et al. | 310/68 B |
| 4,441,042 A * | 4/1984 | Colwell | 310/91 |
| 4,593,163 A | 6/1986 | Fisher | |
| 4,644,204 A * | 2/1987 | Lakin | 310/89 |
| 4,858,303 A | 8/1989 | Fisher | |
| 5,258,675 A | 11/1993 | Nelessen | |
| 5,929,545 A | 7/1999 | Fargo | |
| 6,380,645 B1 | 4/2002 | Scott | |
| 6,407,474 B1 | 6/2002 | Mahn et al. | |
| 6,559,566 B2 | 5/2003 | Modi et al. | |
| 6,707,202 B2 | 3/2004 | Fadler et al. | |
| 6,755,157 B1 | 6/2004 | Stevens et al. | |
| 6,888,276 B2 | 5/2005 | Lau | |
| 7,105,976 B2 | 9/2006 | Stewart et al. | |
| 7,180,215 B2 | 2/2007 | Archer et al. | |
| 7,256,522 B2 | 8/2007 | Johnson et al. | |
| 7,352,095 B2 | 4/2008 | Archer et al. | |
| 7,358,634 B2 | 4/2008 | Archer et al. | |
| 7,420,302 B2 | 9/2008 | Archer et al. | |
| 2002/0125778 A1 | 9/2002 | Obara | |
| 2003/0184169 A1 | 10/2003 | Fadler et al. | |
| 2004/0255878 A1 | 12/2004 | Stevens et al. | |
| 2006/0070228 A1 | 4/2006 | Stewart et al. | |
| 2006/0267431 A1 | 11/2006 | Johnson et al. | |
| 2007/0075597 A1 | 4/2007 | Seidler et al. | |

* cited by examiner

*Primary Examiner* — Thanh Lam
(74) *Attorney, Agent, or Firm* — Armstrong Teasdale, LLP (57) ABSTRACT

An electric motor is described that includes a mid-shield, a chassis, and a motor control unit configured to be mounted to the chassis. The chassis includes a plurality of clinches formed proximate a first end of the chassis and configured to provide axial positioning of the mid-shield with respect to the chassis.

19 Claims, 8 Drawing Sheets

METHODS AND APPARATUS FOR REDUCING THE SIZE OF ELECTRIC MOTORS

CROSS-REFERENCE TO RELATED APPLICATIONS

This application claims priority of Provisional Patent Application Ser. No. 61/093,124, filed Aug. 29, 2008, which is hereby incorporated by reference in its entirety.

BACKGROUND

The field of the disclosure relates generally to electric motors, and more particularly, to methods and apparatus for reducing the size of electric motors.

Electric motors, of which electronically commutated motors (ECMs) are but one example, are used in a wide variety of applications. ECMs are sometimes referred to in the industry, and herein, as brushless DC motors. ECMs, like other motors, generally incorporate a magnetic rotor core that is energized by the electric field emanating from a stator assembly.

In most applications, motors are mounted to a frame or other structure, typically using mounting bolts, the mounting bolts engaging or extending through the motor chassis. It is a continuing effort to reduce the weight and expense of such electric motors. As electric motors include a multitude of components, such motors may be referred to as a motor assembly. Some efforts have been made to reduce expense by reducing the number of components of electric motors. Generally, this is accomplished by varying the configuration of a first component so that it provides its original functionality plus the functionality of a second component, which is then no longer needed in the completed motor assembly.

BRIEF SUMMARY

In one aspect, an electric motor is provided that includes a mid-shield, a chassis, and a motor control unit configured to be mounted to the chassis. The chassis includes a plurality of clinches formed proximate a first end of the chassis and configured to provide axial positioning of the mid-shield with respect to the chassis.

In another aspect, a chassis for an electric motor is provided. The chassis includes a first end, a second end, and a plurality of clinches formed proximate the first end of the chassis. The clinches are configured to provide axial location of a mid-shield mounted within the chassis with respect to the chassis.

In still another aspect, an electric motor is provided that includes a chassis, a mid-shield configured for fixed placement within the chassis, a motor control unit configured to be mounted to the chassis, a plurality of cap screws, and a plurality of cap sleeves. The mid-shield includes a plurality of threaded holes therein and the cap screws are configured to attach the motor control unit to the mid-shield utilizing the threads within the mid-shield. The cap sleeves are placed between the mid-shield and the motor control unit. Respective cap screws configured to pass through respective cap sleeves, and the cap sleeves operate to transfer a clamping load created by the tightening torque on the cap screws to a surface of the mid shield.

DETAILED DESCRIPTION

Figure 1:
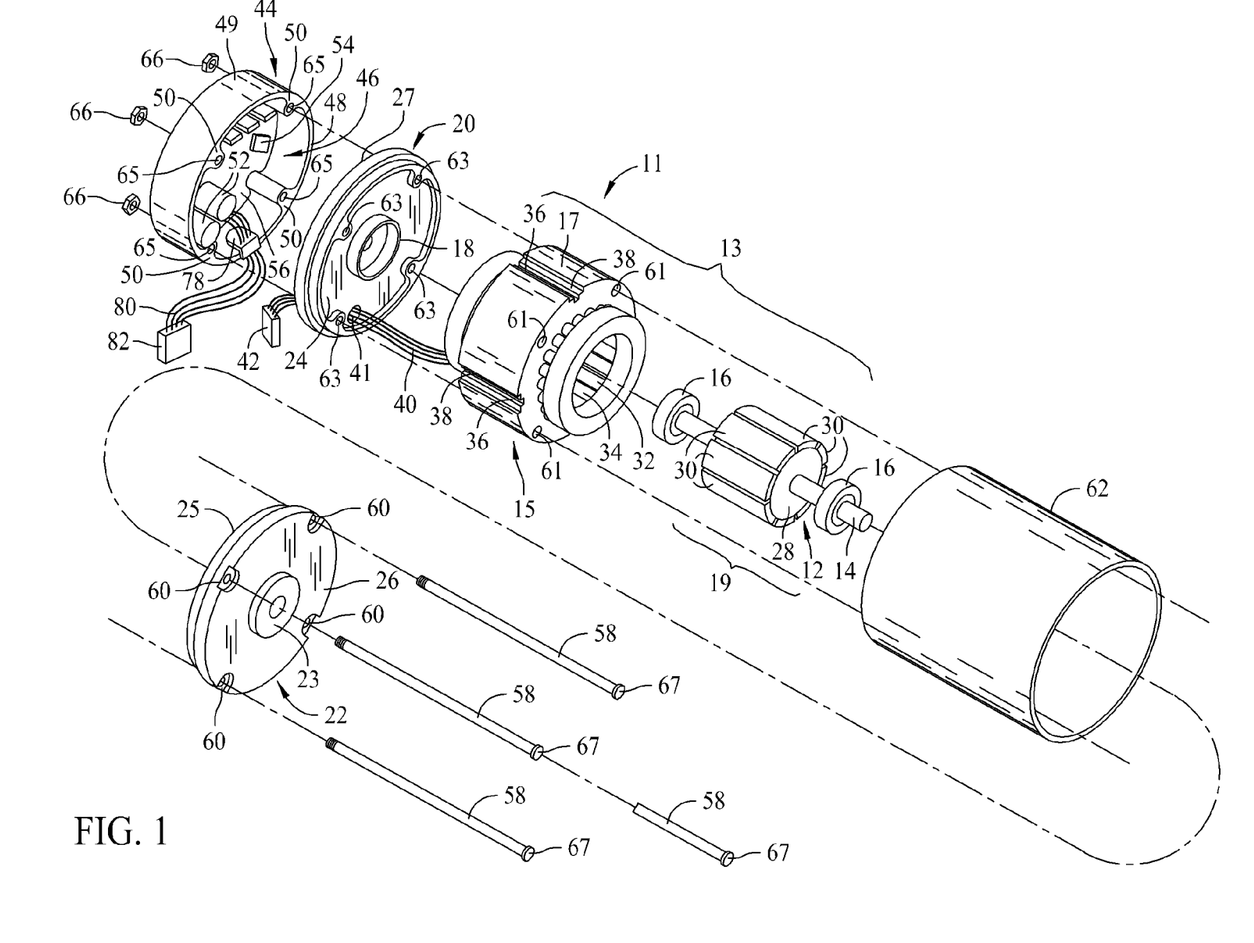
FIG. 1 is an exploded view of an integrated electronically commutated motor (ECM) and control circuit assembly.
Figure 2:
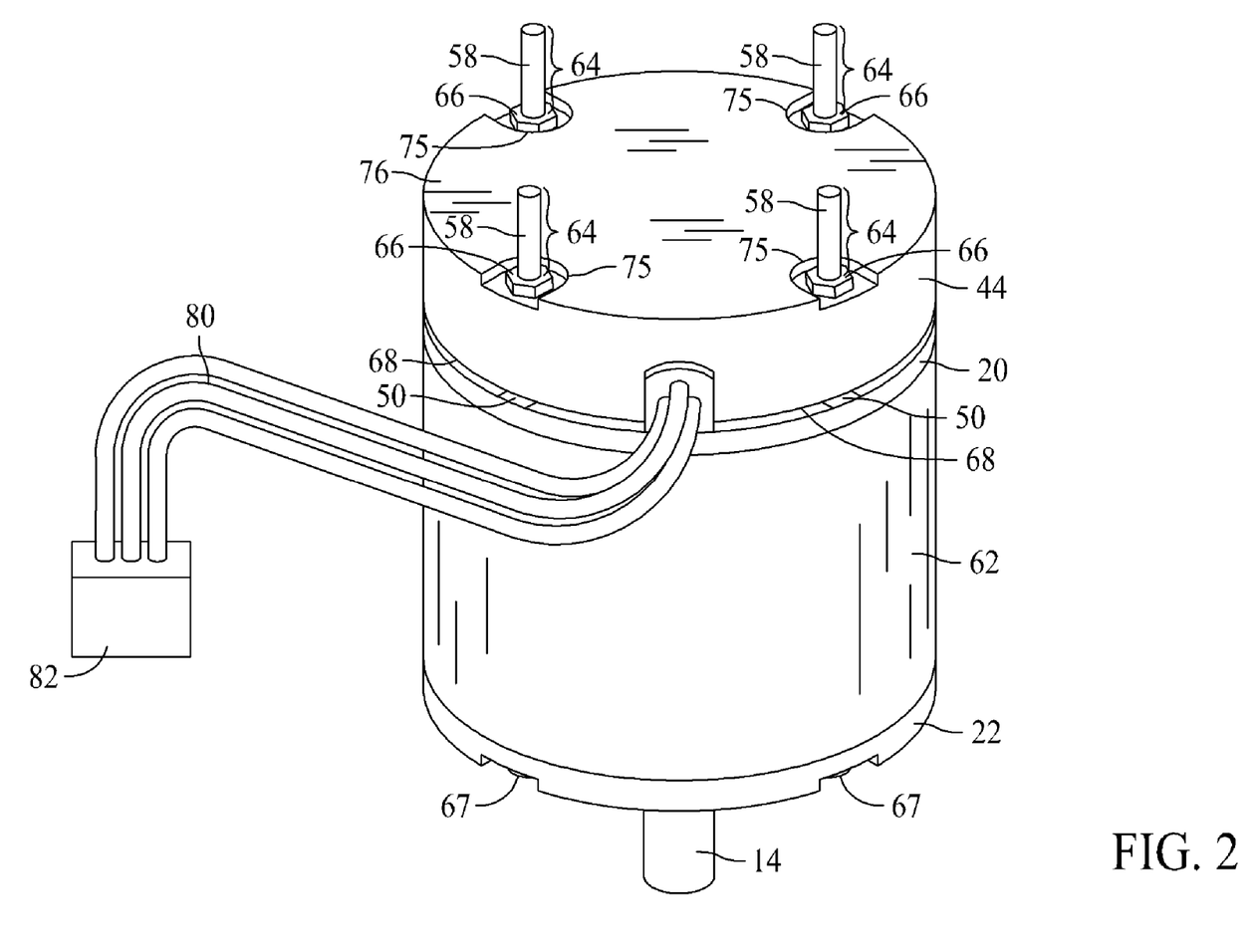
FIG. 2 is a fully assembled view of the ECM and control circuit assembly of FIG. 1.

Referring to the drawings, and more particularly to FIGS. 1 and 2, reference character 10 generally designates an integrated electronically commutated motor and control circuit assembly. Motor assembly 10 comprises a brushless electronically commutated DC motor 13 having a stationary assembly 15 including a stator or core 17 and a rotatable assembly 19 including a permanent magnet rotor 12 and a shaft 14. A fan (not shown) or other means to be driven such as means for moving air through an air handling system engages the shaft 14. Specifically, motor assembly 10 is for use in combination with an air handling system such as an air conditioning system including a fan for blowing air over cooling coils for supplying the cooled air to a building.

Rotor 12 is mounted on and secured to the shaft 14 journaled for rotation in conventional bearings 16. The bearings 16 are mounted in bearing supports 18 integral with a first end member 20 and a second end member 22. The end members 20 and 22 are substantially flat and parallel to each other. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

The rotor 12 comprises a ferromagnetic core 28 and is rotatable within the bore of stator 17. Eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. While magnets 30 on rotor 12 are illustrated for purposes of disclosure, it is contemplated that other rotors having different constructions and other magnets different in both number, construction, and flux fields may be utilized with such other rotors so as to meet at least some of the objects thereof.

Stationary assembly 15 comprises a plurality of winding stages 32 adapted to be electrically energized to generate an electromagnetic field. Stages 32 are coils of wire wound around teeth 34 of the laminated stator core 17. The core 17 may be held together by four retainer clips 36, one positioned within each notch 38 in the outer surface of the core 17. Alternatively, the core 17 may be held together by other suitable means, such as for instance welding or adhesively bonding, or merely held together by the windings, all as will be understood by those skilled in the art. The winding end turns extend beyond the stator end faces and winding terminal leads 40 are brought out through an aperture 41 in the first end member 20 terminating in a connector 42. While stationary assembly 15 is illustrated for purposes of disclosure, it is contemplated that other stationary assemblies of various other constructions having different shapes and with different number of teeth may be utilized within the scope of the invention so as to meet at least some of the objects thereof.

Motor assembly 10 further includes a cap 44 which is mounted on the rear portion of the motor assembly 10 to enclose within the cap 44 control means 46 for the motor 13. The cap 44 includes an edge 48 having a plurality of spacing elements 50 projecting therefrom which engage the outer side 27 of the first end member 20. Cap 44 includes a substantially annular side wall 49 with the top of the side wall 49 forming edge 48. The control means 46 is positioned adjacent the outer side 27 of the first end member 20. The control means 46 includes a plurality of electronic components 52 and a connector (not shown) mounted on a component board 56, such as a printed circuit board. The control means 46 is connected to the winding stages 32 by interconnecting connector 42 and connector 54. The control means 46 applies a voltage to one or more of the winding stages 32 at a time for commutating the winding stages 32 in a preselected sequence to rotate the rotatable assembly 19 about an axis of rotation.

Connecting elements 58 comprising a plurality of bolts pass through bolt holes 60 in the second end member 22, bolt holes 61 in core 17, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 15, and the rotatable assembly 19 therebetween. Additionally, a housing 62 may be positioned between the first end member 20 and the second end member 22 for enclosing and protecting the stationary assembly 15 and the rotatable assembly 10.

Electronically commutated motor 13 as described herein merely for purposes of disclosure is an eight rotor-pole motor, but it will be understood that the electronically commutated motor of this invention may include any even number of rotor poles and the number of stator poles are a multiple of the number of rotor poles, for example, the number of stator poles may be based on the number of phases. In one exemplary embodiment not shown in the Figures, a three-phase ECM includes six rotor pole pairs and 18 stator poles.

The motor assembly 10 according to the invention operates in the following manner. When the winding stages 32 are energized in a temporal sequence three sets of eight magnetic poles are established that will provide a radial magnetic field which moves clockwise or counterclockwise around the core 17 depending on the preselected sequence or order in which the stages are energized. This moving field intersects with the flux field of the magnet 30 poles to cause the rotor to rotate relative to the core 17 in the desired direction to develop a torque which is a direct function of the intensities or strengths of the magnetic fields.

The winding stages 32 are commutated without brushes by sensing the rotational position of the rotatable assembly 19 as it rotates within the core 17 and utilizing electrical signals generated as a function of the rotational position of the rotor 12 sequentially to apply a DC voltage to each of the winding stages 32 in different preselected orders or sequences that determine the direction of the rotation of the rotor 12. Position sensing may be accomplished by a position-detecting circuit responsive to the back electromotive force (EMF) to provide a simulated signal indicative of the rotational position of the rotor 12 to control the timed sequential application of voltage to the winding stages 32 of the motor 13. Other means of position sensing may also be used.

FIG. 2 illustrates the fully assembled motor assembly 10. Connecting elements 58 pass through the second end member 22, the stationary assembly 15, the first end member 20, and the cap 44. The connecting elements 58 have a portion 64 which projects laterally from the cap 44. Portion 64 is adapted to engage a support structure (not shown) for supporting the motor assembly 10. The connecting elements 58 may be secured in place by placing a nut 66 engaging the threads on each of the portions 64 of the connecting elements 58. A wiring harness 80 and connector 82 are utilized to connect motor assembly 10 to an electrical power source and a source of solar energy as further described below.

Spacing elements 50 when engageable with the outer side 27 of the first end member 20 form air gaps 68 between the spacing elements 50, the edge 48, and the outer side 27. The air gaps 68 permit flow through the cap 44 thereby dissipating heat generated by the motor assembly 10. Additionally, if the motor assembly 10 is exposed to rain the air gaps 68 permit rain which has entered the cap 44 to flow out of the cap 44 via the air gaps 68.

Indentations 75 are formed in a bottom 76 of the cap 44 which provide a space for a tool (not shown) to fit in to tighten the nuts 66. The indentations 75 also allow the nuts 66 to be mounted on the connecting elements 58 flush with the bottom 76 of the cap 44.

Figure 3:
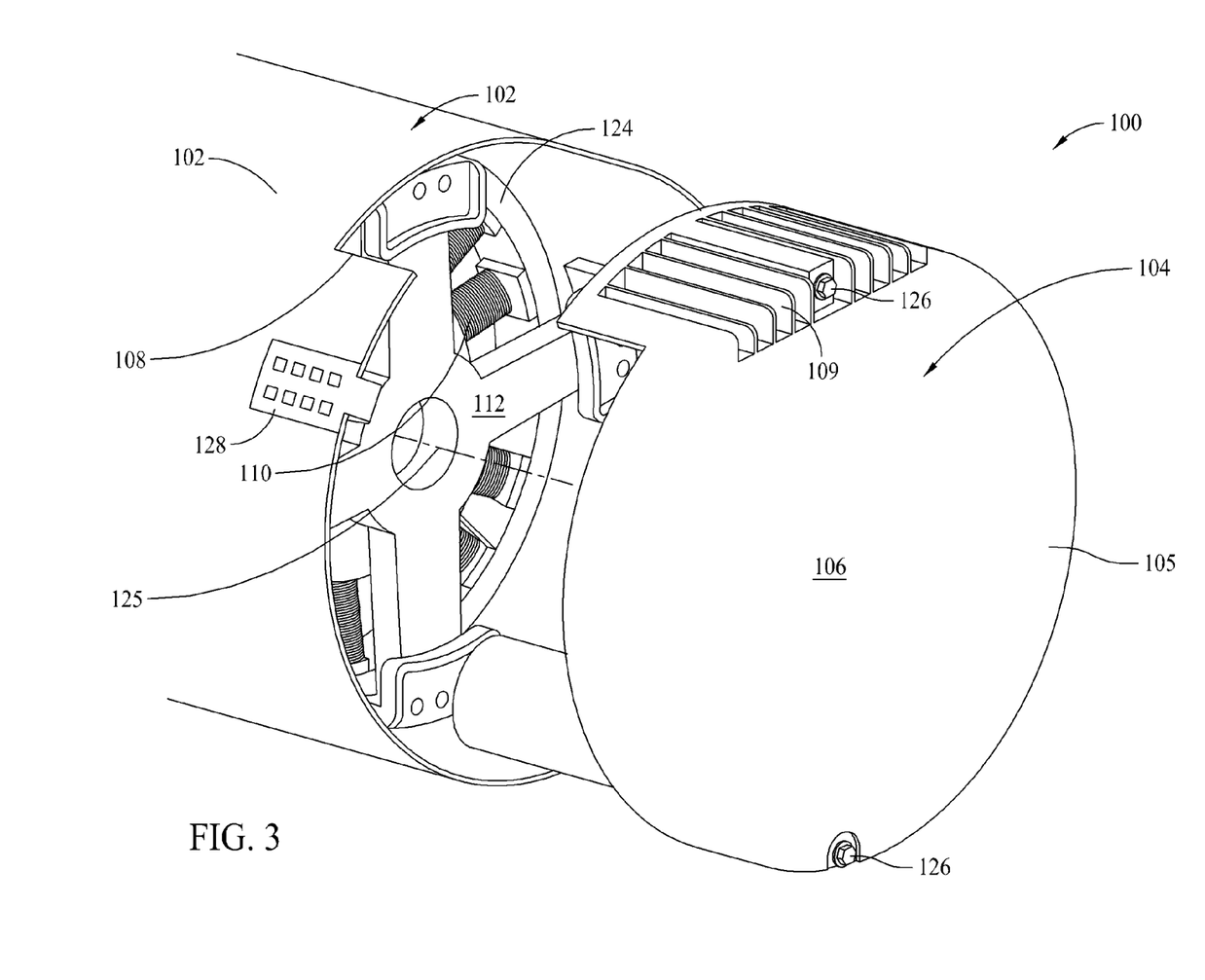
FIG. 3 is an exploded end view of an alternative embodiment for an ECM.

FIG. 3 is an exploded end view of an alternative embodiment for an ECM 100. Motor 100 includes a motor enclosure, or chassis, 102 and a motor control unit 104 configured for attachment to motor enclosure 102. A chassis 105 of motor control unit 104 serves as an end shield 106 for motor 100. Motor enclosure 102 also includes a slot 108 which engages a heat sink 109 formed in chassis 105 as further described below. While motor control unit 104 includes chassis 105, motor 100 is configured such that motor enclosure 102 provides substantially all of the enclosure for motor control unit 104. Within motor enclosure 102 are windings 110 of motor 100 and a mid shield 112 configured for placement between windings 110 and motor control unit 104.

The placement and configuration of mid shield 112 allows motor control unit 104 of motor 100 to be removed and replaced without disruption or displacement of a motor winding assembly 124 which includes windings 110 of motor 100. As illustrated, motor enclosure 102 is configured to form a part of the enclosure for motor control unit 104, along with end shield 106, allowing for a one-piece enclosure configuration. Mid shield 112 is also configured to meet any airflow, voltage clearances and assembly height limitations imposed on motor 100.

In one embodiment, as illustrated, mid shield 112 fits precisely with respect to a centerline 125 of motor 100 and further aligns with two bolts 126 that pass through end shield 106 of motor control unit 104 to clamp and secure mid shield 112 and motor control unit 104 within motor enclosure 102. This alignment and symmetry remain even when chassis 105 containing the electronics of motor control unit 104 is removed. Retaining the alignment and symmetry within enclosure 102 is important as it lowers a replacement cost of motor control unit 104 in the field. Mid shield 112 also contributes to a lower material cost for motor 100, because with mid shield 112, motor enclosure 102 is utilized as a part of the containment enclosure for portions of motor control unit 104 as shown in FIG. 3, decreasing the size of motor 100 as compared to motor 11 (shown in FIGS. 1 and 2). Additionally, such a configuration allows for a placement of a power connector 128 that is flush with chassis 102.

Utilization of mid shield 112 allows motor control unit 104 to be removed from enclosure 102 without disturbing the rest of the motor assembly, for example, windings 110. The non-disturbance is obtained by using mid shield 112 to secure a bearing that engages a motor shaft (neither shown in FIG. 1) of motor 100. Therefore, enclosure 102 is additionally configured to provide any required clearances for the electrical components (e.g., motor control unit 104) of motor 100 to allow disengagement of motor control unit 104 from motor 100.

Figure 4:
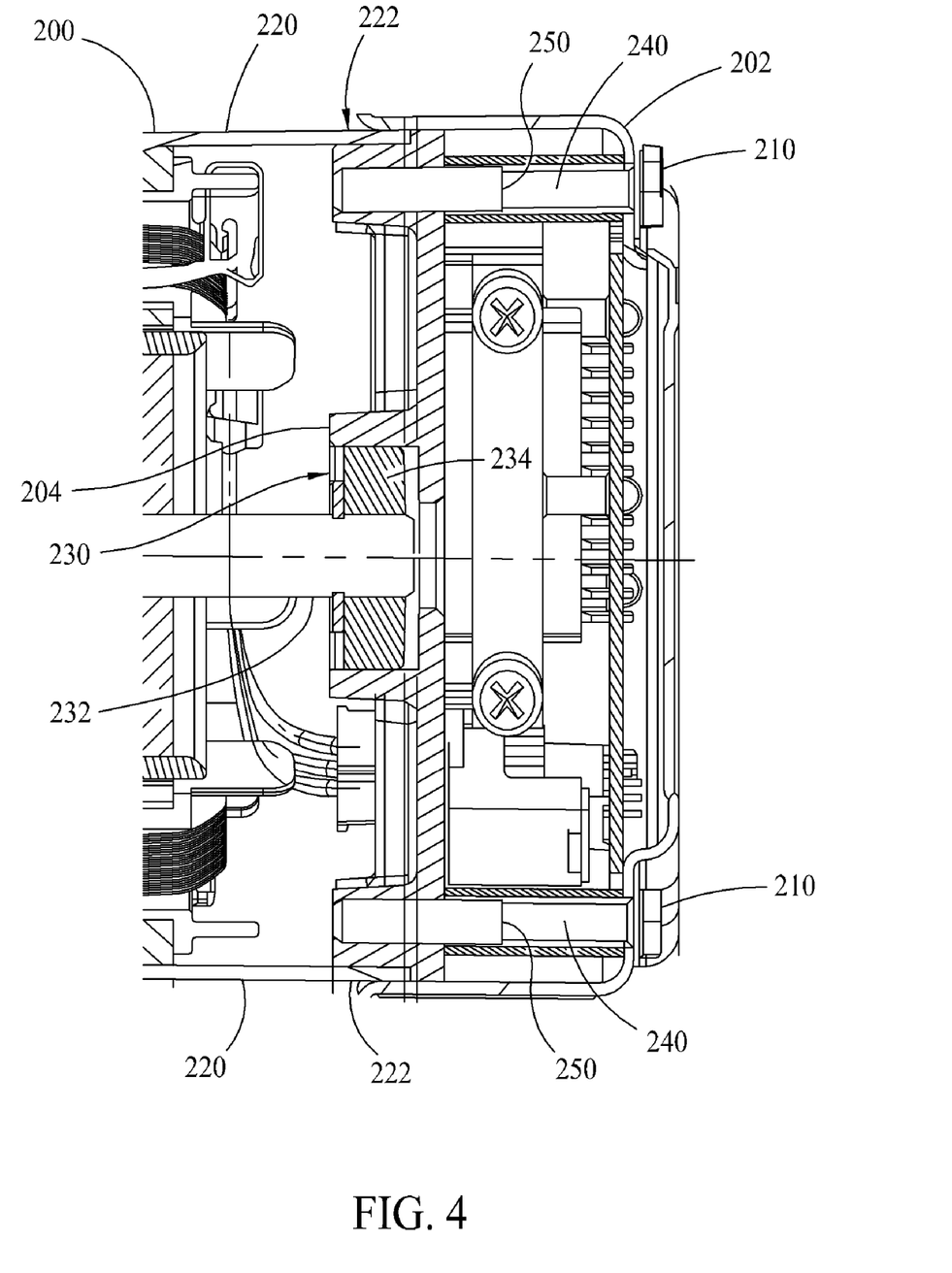
FIG. 4 is a side cross-sectional view of a motor and control assembly that incorporates a sleeve around the clamp screw to maintain integrity of the mid-shield bearing pocket.

FIG. 4 is a side cross-sectional view of a portion of a motor 200 and motor control unit 202. Motor 200 incorporates a mid shield 204 similar to the one described above with respect to FIG. 3. Cap screws 210 are utilized to attached the motor control unit 202 to the motor 200 via threads formed within the mid shield 204. More specifically, a motor chassis 220 is deformed to provide a clinch area 222. The clinch area 222 operates to retain a position of the mid shield 204 within the motor chassis 220. In prior embodiments, as the cap screws 210 were tightened, it was possible to distort the mid shield 204 and subsequently a distortion of the mid shield bearing pocket 230. In some units this distortion affected the preload on the shaft 232 and bearing assemblies 234. In some other units, the mid-shield 204 was being pulled from the clinch area 222 due to the torque applied by the cap screws 210. The cap screws 210 are also referred to sometimes as clamp screws.

The embodiment of FIG. 4, incorporates a cap sleeve 240 through which the cap screw 210 is inserted. The cap sleeve 240 transfers the clamping load created by the tightening torque on the clamp screws 210 to a top surface 250 of the mid shield 204. The addition of the cap sleeves 240 to the motor control unit 202, through which the threads of the cap screw 210 is forwarded, as well as through the cap sleeve 240 itself, for threading into female threads within the mid shield 204, maintains bearing pocket integrity as well as a positioning of the mid shield 210 within the clinch areas 222 formed in the motor chassis 220. In other terms, the cap sleeve 240 operates to prevent the mid shield 210 from being distorted or dislocated by forces imparted by operation of the cap screws 210.

As described above, incorporation of the cap sleeves 240 prevent the mid shield bearing bore from distorting and pinching the bearing. In certain cases, the pinched bearing eliminated bearing movement so that a preload on the bearing from a wave spring was lost. Having a preload optimizes bearing life and reduces bearing noise. Other benefits from the incorporation of the cap sleeves 240 also are accrued as further described herein. The described embodiments also result in a motor size reduction since the mechanical strength associated with the cap sleeves 240 allow thinner gauge steel to be utilized for the control unit enclosure and allow a mid shield of smaller cross-section (and less material) to be used. In addition, since the mid shield 204 is within the motor chassis 220, motor length is reduced as compared to motors which incorporate an end shield. The mid shield allows for some components of the motor control unit 202 to be nested within the chassis 220 providing at least a portion of the motor length reduction.

Figure 5:
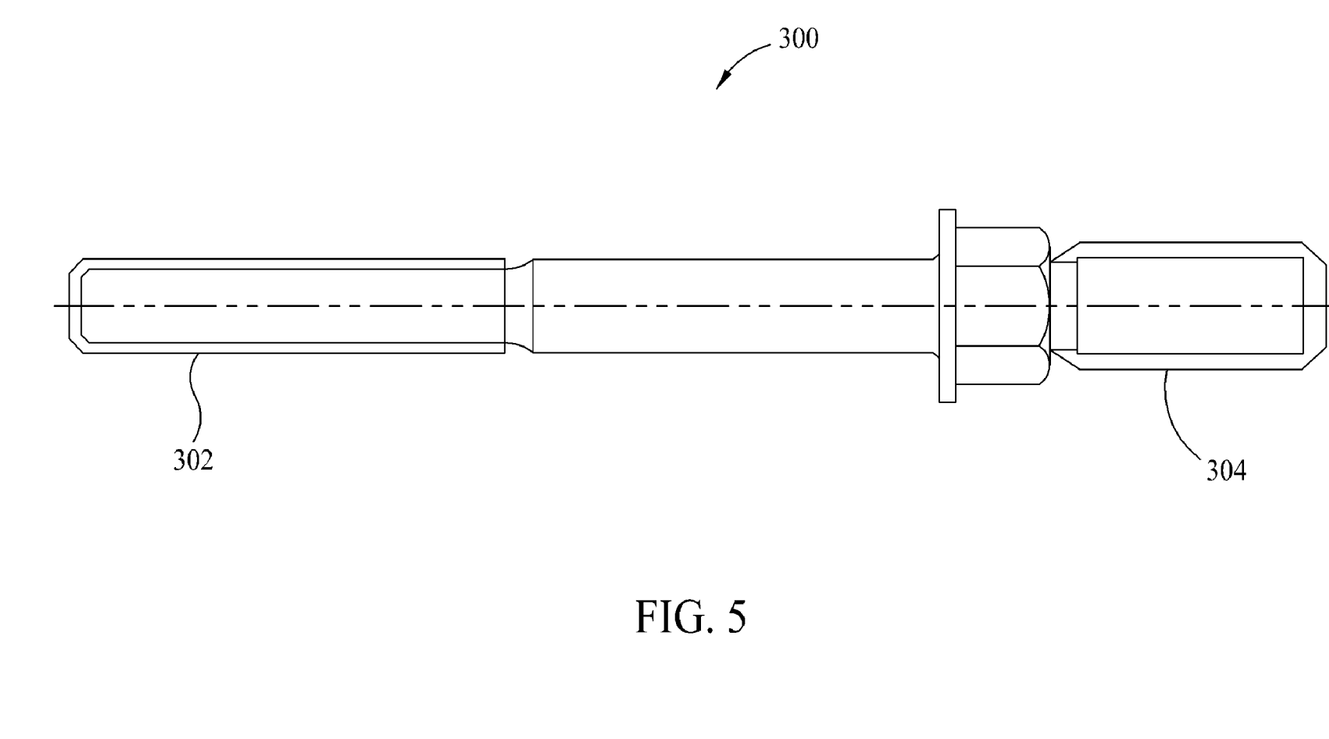
FIG. 5 is an illustration of a clampbolt that can be used to secure a motor control unit to a motor chassis.

In another embodiment, a clampbolt 300, illustrated in FIG. 5, is used to secure the motor control unit 202 to the motor chassis 220. The clampbolt 300 includes a first end 302 having a first diameter and a first thread size for attaching the motor control unit 202 to the motor chassis 220 while a second end 304 having a second diameter and a second thread size is used as a threaded stud for customer mounting. In the illustrated embodiment, the first diameter is smaller than the second diameter. In a specific embodiment, the first thread size is 8-32 and the second thread size is 10-32.

Use of a smaller diameter for motor control unit 202 mounting provides some reduction in costs, but another advantage is that the smaller diameter of the first end 302 allows for a size reduction in the motor control unit. Previously, the ends of clampbolts were of the same diameter, and packaging of the components within the motor control unit was tightly spaced. However, the described reduction in diameter of the first end 302 frees up some space within the motor control unit 220, allowing for a reduction in its overall size. The customer mounting interface is the same as the second end 304 uses the same diameter and threading as previous units. More specifically, from an end user standpoint, the configuration utilizing the clampbolt 300 provides a bolt circle configuration that is the same as at least one permanent split capacitor bolt configuration, allowing direct replacement.

In summary, the double end clampbolt 300 allows an end user to mount a motor from the control unit end, allowing an ECM to be utilized as a direct replacement for a permanent split capacitor motor while still maintaining the mechanical strength of the motor assembly.

Figure 6:
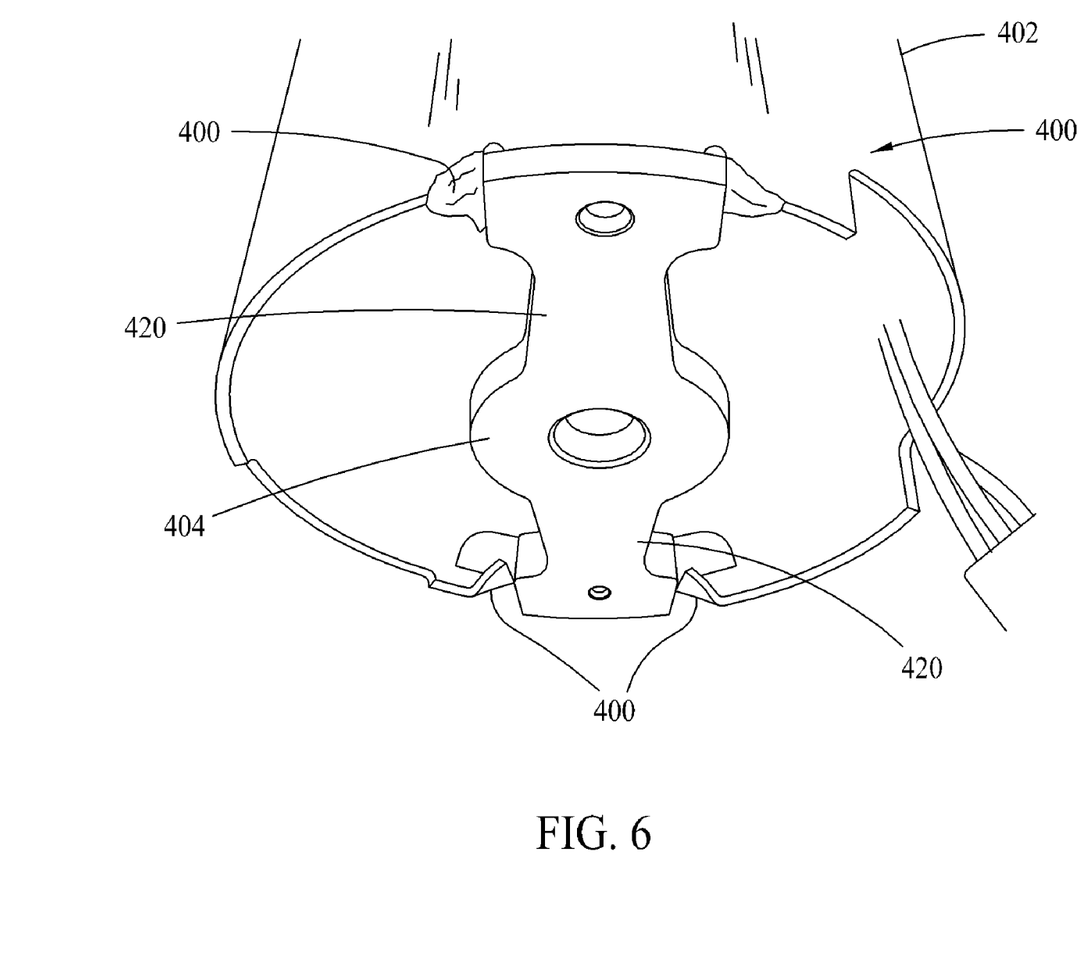
FIG. 6 is an illustration of a mid shield that is held in place in a motor chassis by clinches formed in the motor chassis.
Figure 7:
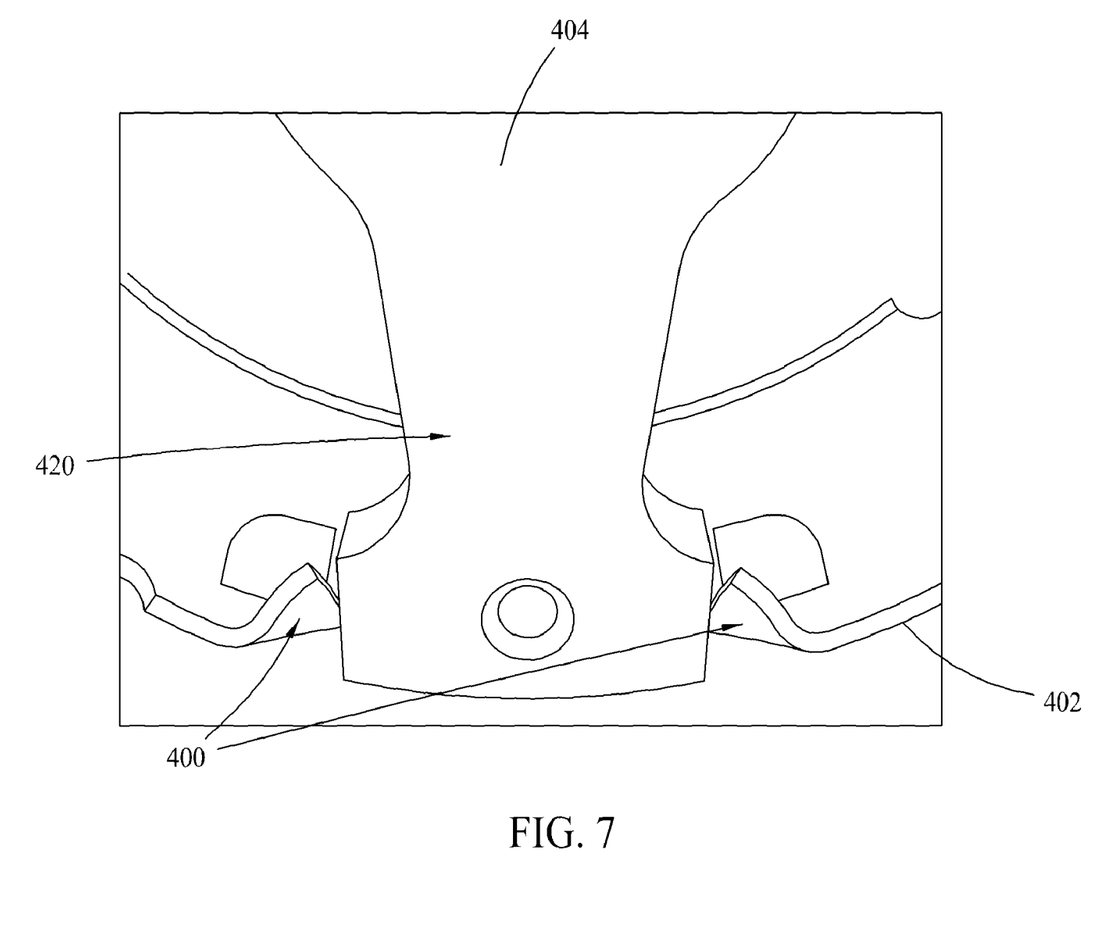
FIG. 7 is a detailed view of one set of clinches shown in FIG. 6.

In another embodiment, illustrated in FIGS. 6 and 7, clinches 400 are formed in the motor enclosure, or chassis, 402 to secure the motor mid shield 404 to the motor enclosure 402, in one embodiment, without using fasteners. Such a configuration provides axial location, or positioning (the mid shield 404 does not rotate within the motor enclosure 402), as well as providing an alignment of bearing pockets in three dimensions to maintain a proper preload of bearings and a proper bearing for extending the life of the motor.

Other benefits accrue from the utilization of clinches 400. Specifically, the use of the clinches 400 allowed an overall diameter of the motor to be reduced since no fasteners are utilized through the stator. Use of fasteners through the stator would require that the stator be smaller in outer diameter or that the motor enclosure 402 to be larger in diameter. Since the clinches 400 allow the motor to be fabricated without fasteners that extend from the motor control unit (not shown in FIGS. 6 and 7), through the mid-shield 404 and the remainder of the motor enclosure 402, both the stator and windings can be maximized within the envelope defined by the motor enclosure 402.

Figure 8:
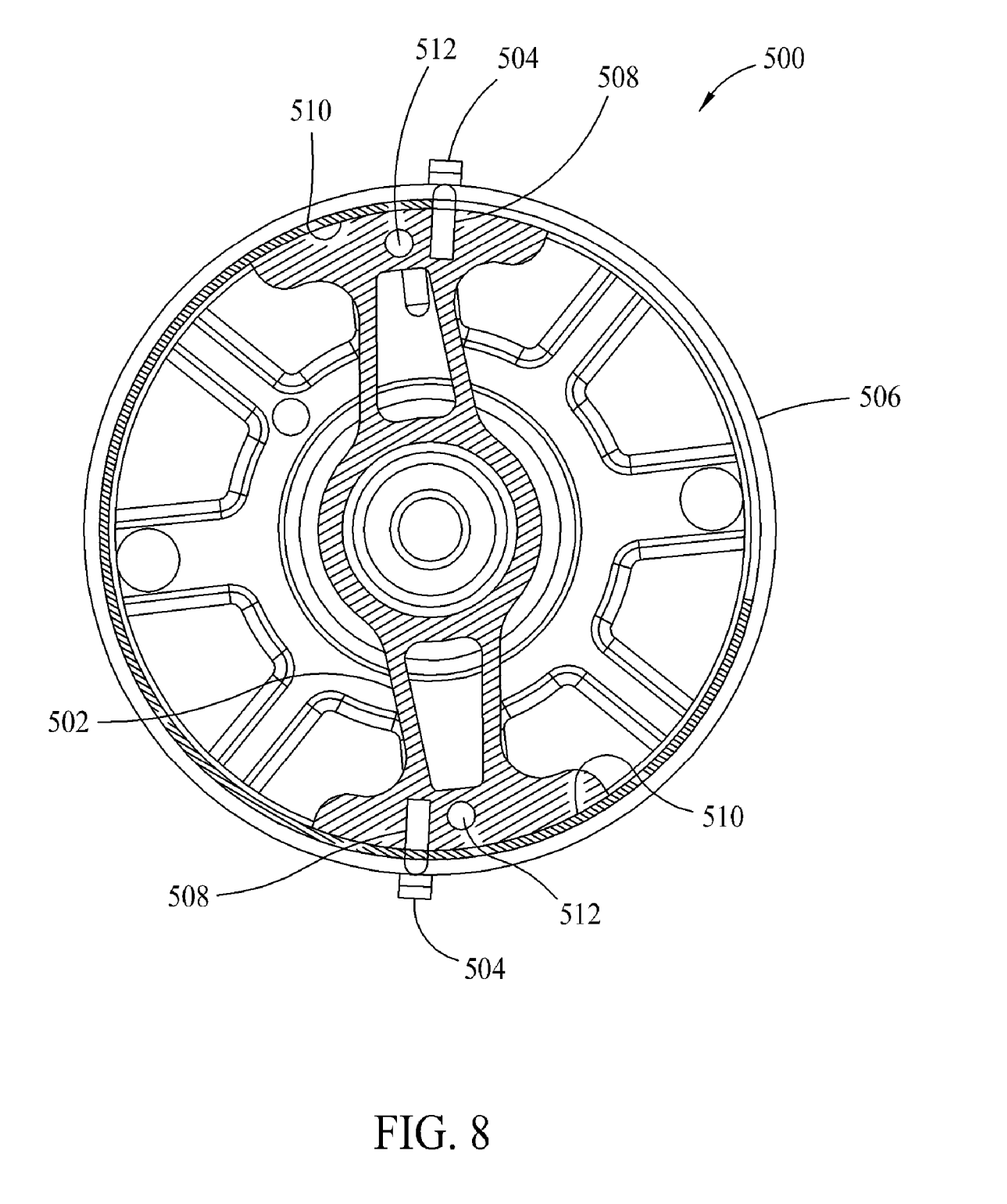
FIG. 8 is a cross-sectional diagram of a motor configured to utilize fasteners that are inserted through the motor enclosure and into the chassis engaging sides of a mid-shield.

By nesting the mid shield 404 inside the motor enclosure 402, motor enclosure corners (clinches 400) can be formed and utilized as retaining features, which maintains a design goal of maintaining the shortest possible overall assembly length. Through the utilization of the clinching configuration described in the preceding paragraphs, a mid shield 404 with only two spokes 420 can be used, thereby allowing control components from the motor control unit to protrude into the motor space. The described configuration combines the functions of two parts, the motor enclosure 402 and the second end member 22 (shown in FIG. 1) into one deep drawn, cup-like component, having a bearing pocket, which further reduces the overall length and diameter of the motor since no second end fasteners are utilized FIG. 8 is a cross-sectional diagram of a motor 500 that includes a mid-shield 502 that is retained in position through the utilization of fasteners 504 that are inserted through the motor enclosure, or chassis, 506 and into bores 508 formed in the chassis engaging sides 510 of the mid-shield 502. In one embodiment, the fasteners 504 are used in addition to the above described clamping bolts (not shown in FIG. 6) which pass through holes 512 of the mid-shield 502. The motor configuration that includes the fasteners 504, in one embodiment, helps maintain a smaller motor overall size while still providing the capability to overcome the severe loading that may result from motor applications where alternative mounting orientations and high vibration operational modes may be encountered. In a specific embodiment, fasteners 504 are thread forming screws.

In one alternative embodiment, the fasteners 504 are utilized in combination with the above described clinches 400. Such a configuration also addresses the alternative mounting configurations mentioned above, as the fasteners 504 counteracts the increased load such mounting configurations impart onto the clinches.

The above described embodiments provide various improvements to electric motor fabrication and packaging resulting in or more of motor length reduction, bearing pocket integrity, reduced part counts, reduction in costs, and improved durability when the motors are mounted in different orientations. The embodiments, as described, can be used separately, or in various combinations to obtain the desired improvements.

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor comprising:
   a mid-shield;
   a chassis, said chassis comprising a plurality of clinches formed proximate a first end of said chassis and configured to provide axial positioning of said mid-shield with respect to said chassis; and
   a motor control unit configured to be mounted to said chassis.

2. An electric motor according to claim 1 further comprising:
   a plurality of cap screws, said cap screws configured to attach said motor control unit to said mid-shield utilizing threads within said mid-shield.

3. An electric motor according to claim 2 further comprising a plurality of cap sleeves, said cap sleeves between said mid-shield and said motor control unit, respective said cap screws configured to pass through respective cap sleeves, said cap sleeves configured to transfer a clamping load created by the tightening torque on said cap screws to a surface of said mid shield.

4. An electric motor according to claim 3 wherein said mid-shield comprises a bearing pocket, said cap screws and said cap sleeves are configured to maintain an integrity of said bearing pocket and a positioning of said mid shield within said clinches.

5. An electric motor according to claim 2 wherein said mid-shield comprises a bearing pocket, said cap screws configured to maintain an integrity of said bearing pocket and a positioning of said mid shield within said clinches.

6. An electric motor according to claim 1 wherein said motor control unit comprises a plurality of components, and said mid-shield comprises one or more of at least one opening and at least one indentation, at least a portion of said components extending into said chassis proximate the one or more of opening and indentation, providing an electrical clearance for said components.

7. An electric motor according to claim 1 further comprising a plurality of clampbolts, said clampbolts comprising a first end having a first diameter and a first thread size configured to attach said motor control unit to said mid-shield utilizing threads within said mid-shield, and a second end having a second diameter and a second thread size configured for use as a threaded stud for mounting of said motor.

8. A motor according to claim 7 wherein the first diameter is less than the second diameter.

9. An electric motor according to claim 1 wherein said mid-shield comprises a bearing pocket, said clinches in combination with said chassis configured to engage said mid-shield such that an alignment of said bearing pocket is provided in three dimensions.

10. An electric motor according to claim 1 wherein said mid-shield comprises chassis engaging sides, said motor further comprising a plurality of fasteners, said fasteners inserted through said motor control unit, said chassis and into said chassis engaging sides of said mid-shield.

11. A chassis for an electric motor comprising:
    a first end;
    a second end; and
    a plurality of clinches formed proximate said first end of said chassis, said clinches configured to provide axial positioning of a mid-shield mounted within said chassis with respect to said chassis.

12. A chassis according to claim 11 further comprising a plurality of holes formed therein, said holes configured to align with bores formed in chassis engaging sides of a mid-shield for insertion of fasteners.

13. An electric motor comprising:
    a chassis;
    a mid-shield configured for fixed placement within said chassis, said mid-shield comprising a plurality of threaded holes therein;
    a motor control unit configured to be mounted to said chassis;
    a plurality of fasteners configured to attach said motor control unit to said mid-shield utilizing threads within said mid-shield; and
    a plurality of sleeves positioned between said mid-shield and said motor control unit, respective said fasteners configured to pass through respective said sleeves, said sleeves configured to transfer a clamping load created by a tightening torque on said fasteners to a surface of said mid shield.

14. An electric motor according to claim 13 wherein said chassis comprises a plurality of clinches formed proximate a first end of said chassis and configured to provide axial alignment of said mid-shield with respect to said chassis.

15. An electric motor according to claim 13 wherein said motor control unit comprises a plurality of components, and said mid-shield comprises one or more of at least one opening and at least one indentation, at least a portion of said components extending into said chassis proximate the one or more of opening and indentation, providing an electrical clearance for said components.

16. An electric motor according to claim 13 wherein said fasteners comprise a first end having a first diameter and a first thread size configured to attach said motor control unit to said mid-shield utilizing said threaded holes within said mid-shield, and a second end having a second diameter and a second thread size configured for use as a threaded stud for mounting of said motor.

17. An electric motor according to claim 16 wherein the first diameter is less than the second diameter.

18. An electric motor according to claim 13 wherein said mid-shield comprises chassis engaging sides each comprising at least one bore formed therein, said motor further comprising a second plurality of fasteners, said second plurality of fasteners inserted through a side wall of said motor control unit, said chassis and into said bores within said chassis engaging sides of said mid-shield.

19. An electric motor comprising:
a chassis comprising a plurality of clinches formed proximate a first end of said chassis;
a mid-shield configured to engage said clinches for fixed placement within said chassis, said mid-shield comprising a plurality of threaded holes therein;
a motor control unit configured to be mounted to said chassis;
a plurality of fasteners configured to attach said motor control unit to said mid-shield utilizing threads within said mid-shield; and
a plurality of sleeves positioned between said mid-shield and said motor control unit, respective said fasteners configured to pass through respective said sleeves, said sleeves configured to transfer a clamping load created by a tightening torque on said fasteners to a surface of said mid shield.

* * * * *